United States Patent
Naito et al.

(10) Patent No.: US 7,758,830 B2
(45) Date of Patent: Jul. 20, 2010

(54) MERCURY REMOVING APPARATUS AND MERCURY REMOVING METHOD

(75) Inventors: Toshiyuki Naito, Utsunomiya (JP);
Hiroyuki Kamata, Tokyo (JP);
Shunichiro Ueno, Yokohama (JP)

(73) Assignee: IHI Corporation (JP)

( * ) Notice: Subject to any disclaimer, the term of this patent is extended or adjusted under 35 U.S.C. 154(b) by 0 days.

(21) Appl. No.: 12/340,958

(22) Filed: Dec. 22, 2008

(65) Prior Publication Data

US 2009/0169450 A1    Jul. 2, 2009

(30) Foreign Application Priority Data

Dec. 27, 2007    (JP) .............................. 2007-335475

(51) Int. Cl.
*B01D 53/34*    (2006.01)
*B01D 53/50*    (2006.01)
*B01D 53/64*    (2006.01)
*B01D 53/77*    (2006.01)

(52) U.S. Cl. ............... 423/210; 423/242.1; 423/243.01; 423/243.08; 422/168; 422/169; 422/170; 422/172

(58) Field of Classification Search .................. 423/210, 423/242.1, 243.01, 243.08; 422/168, 169, 422/170, 172
See application file for complete search history.

(56) References Cited

U.S. PATENT DOCUMENTS

| | | | |
|---|---|---|---|
| 6,638,485 B1 | 10/2003 | Iida et al. | ..................... 423/210 |
| 7,384,616 B2 * | 6/2008 | Hakka | ....................... 423/210 |
| 7,524,471 B2 * | 4/2009 | Lindau | ....................... 423/210 |

FOREIGN PATENT DOCUMENTS

| | | |
|---|---|---|
| JP | 10-230137 | 9/1998 |
| JP | 2000-325746 | 11/2000 |

* cited by examiner

*Primary Examiner*—Timothy C Vanoy
(74) *Attorney, Agent, or Firm*—Ostrolenk Faber LLP

(57) ABSTRACT

The invention relates to a mercury removing apparatus and a mercury removing method in which a mercury removing ratio is improved with low cost, the mercury removing apparatus removes mercury from exhaust gas generated by coal combustion, an acidic solution spraying nozzle for spraying sulfuric acid into exhaust gas is provided on the down stream side of an absorption tower for removing sulfur oxide from the exhaust gas.

8 Claims, 5 Drawing Sheets

MERCURY REMOVING APPARATUS AND MERCURY REMOVING METHOD

BACKGROUND OF THE INVENTION

1. Field of the Invention

The present invention relates to a mercury removing apparatus and a mercury removing method.

Priority is claimed on Japanese Patent Application No. 2007-335475, filed Dec. 27, 2007, the content of which is incorporated herein by reference.

2. Description of Related Art

Coal combustion gas includes a very small amount of mercury caused by coal. In this mercury, there is poorly-soluble metal mercury ($Hg^0$), water-soluble dyadic mercury ($Hg^{2+}$ ($HgCl_2$)), and granular mercury ($Hg^P$) attached to combustion ashes.

In an exhaust gas processing system, most granular mercury ($Hg^P$) is removed by a precipitation device such as a bug filter or an electrostatic precipitator (EP), and dyadic mercury ($Hg^{2+}$) can be removed by a wet flue gas desulfurization (FGD) device with high efficiency. However, it is difficult to remove metal mercury ($Hg^0$) by EP and FGD. In this case, a method has been proposed for removing metal mercury ($Hg^0$) by oxidizing metal mercury ($Hg^0$) into water-soluble dyadic mercury ($Hg^{2+}$).

For example, in Japanese Patent Application Laid-Open No. 10-230137, since a concentration of hydrogen chloride (HCl) in exhaust gas is as small as 1 ppm to several tens ppm, mercury oxidizing efficiency is low and mercury trapping efficiency in EP or FGD is low.

To raise the concentration of hydrogen chloride in exhaust gas, a method is described for raising a concentration of hydrogen chloride in exhaust gas by injecting a material having halogen such as a chlorine compound to a passage of exhaust gas. In Japanese Patent Application Laid-Open No. 2000-325746, a method is described for burning a chlorine compound together with coal.

Thus, it is possible to efficiently oxidize metal mercury ($Hg^0$), and it is possible to remove metal mercury ($Hg^0$) from exhaust gas.

However, in such a mercury removing method, since a separate chemical such as a chlorine compound is necessary, costs for processing exhaust gas increases.

In consideration of such a problem, the invention provides a mercury removing apparatus and a mercury removing method to improve a mercury removing ratio with low cost.

SUMMARY OF THE INVENTION

The inventors carried out a basic experiment for removing mercury from exhaust gas with high efficiency. As a result, the inventors found that when the concentration of sulfur dioxide ($SO_2$) in exhaust gas decreases, the mercury removing ratio is improved as potential of hydrogen (hereinafter abbreviated as pH) (acidity is high) becomes small.

Hereinafter, the results of the basic experiment will be described.

FIG. 4 is a diagram illustrating a relationship between a sulfur dioxide concentration of exhaust gas and a mercury removing ratio. FIG. 5 is a diagram illustrating a relationship between a potential of hydrogen of absorption solution and a mercury removing ratio.

In the experiment of FIG. 4 and FIG. 5, absorption solutions "A", "B", "C", and "D" of 40[° C.] were used to remove mercury. A potential of hydrogen of absorption solution in the experiment of FIG. 4 was 1.3.

The absorption solutions "A", "B", "C", and "D" in this basic experiment had compositions different from each other.

The absorption solution is a solution containing an oxidizing agent for oxidizing metal mercury ($Hg^0$). The oxidized metal mercury (dyadic mercury) is absorbed by absorption solution, thereby removing it from exhaust gas.

The composition of the exhaust gas used in the experiment of FIG. 4 was 5 vol % of oxygen, 15 vol % of carbon dioxide, and 16.6 to 26.0 $\mu g/cm^3$ of mercury with nitrogen gas being the balance. The gas flow rate was 1 [NL].

The composition of the exhaust gas used in the experiment of FIG. 5 was 5 vol % of oxygen, 15 vol % of carbon dioxide, and 22.9 to 26.6 $\mu g/cm^3$ of mercury with nitrogen gas being the balance, and did not include sulfur dioxide. The gas flow rate was 1 NL.

In FIG. 4, each absorption solution has a different mercury removing ratio. However, when the concentration of sulfur dioxide ($SO_2$) was 500 ppm to 1000 ppm, a mercury removing ratio was substantially regular, which was 50% or less.

On the other hand, when the concentration of sulfur dioxide ($SO_2$) was about 300 ppm, a mercury removing ratio of the absorption solution "B" increased to about 70%. However, mercury removing ratios of the absorption solutions "A", "C", and "D" were not substantially changed from the case where the concentration of sulfur dioxide was 500 ppm.

When the concentration of sulfur dioxide ($SO_2$) was 0 ppm, the mercury removing ratios of all the solutions were in the range of 75% to 90%.

Accordingly, it could be found that the mercury removing ratio was improved according to a decrease in the concentration of sulfur dioxide included in the exhaust gas, and particularly mercury was efficiently removed from the exhaust gas hardly including sulfur dioxide.

In FIG. 5, the hydrogen removing ratio was 50% or less when a pH of the absorption solution was 5.0, although the ratio varied depending each of the solutions.

When a pH of the absolution was 3.0, the mercury removing ratios of the absorption solutions "A" and "C" were 80[%] or more but the mercury removing ratios of the absorption solutions "B" and "D" were not substantially different from when the pH was 5.0. However, when a pH of absorption solutions was 1.0, the mercury removing ratios of all the absorption solutions were 75% or more.

Accordingly, it was found that the mercury removing ratio improved relative to with respect to a decrease in a pH of absorption solution, and particularly mercury was efficiently removed when a pH was about 1.0.

A mercury removing apparatus of the invention could be obtained on the basis of the experimental results. Accordingly, the object of mercury removing apparatus is to remove mercury from exhaust gas generated by the combustion of coal, and is characterized in that an acidic solution spraying portion for spraying acidic solution directly to the exhaust gas is provided on the downstream side of an absorption tower for removing sulfur oxide from the exhaust gas.

Accordingly, since it is possible to increase acidic solution reacting to mercury by decreasing the concentration of sulfur oxide included in exhaust gas in the absorption tower, the mercury removing apparatus of the present invention improves the mercury removing ratio by promoting the oxidization of mercury.

In the mercury removing apparatus of the present invention, it is preferable that an acidic solution generating portion for generating the acidic solution by spraying water to the exhaust gas be provided on the upstream side of the absorption tower, and the acidic solution generating portion and the acidic solution spraying portion be connected.

Accordingly, since it is possible to generate acidic solution from exhaust gas using an easy method and it is not necessary to separately prepare acidic solution, costs relating to acidic solution are reduced.

In the mercury removing apparatus of the invention, it is preferable that the acidic solution generating portion is provided with a solution discharging portion and a solution supplying portion.

Accordingly, since a dust in which water is sprayed thereinto at the acidic solution generating portion the dust is discharged through a discharging portion; hence no dust is accumulated in the acidic solution generating portion. Therefore, it is possible to prevent the acidic solution generating portion from clogging.

In addition, since it is possible to supplement the decreased water volume in the acidic solution generating portion with the solution supplying portion by spraying acidic solution from the acidic solution spraying portion, the mercury removing apparatus can be continuously operated.

In the mercury removing apparatus of the present invention, it is preferable that the acidic solution generating portion have an acidic solution storing portion for storing the acidic solution, and the acidic solution storing portion be provided in the absorption tower.

Accordingly, it is possible to decrease the installation area of the acidic solution generating portion, and thus it is possible to decreases production costs by miniaturization.

A mercury removing method of the present invention is a method to remove mercury from exhaust gas generated by the combustion of coal, and is characterized in that the concentration of sulfur oxide of the exhaust gas is lowered in an absorption tower, and then the exhaust gas discharged from the absorption tower is brought into contact with acidic solution to remove mercury.

With such a method, since it is possible to increase acidic solution reacting to mercury by lowering the concentration of sulfur oxide included in the exhaust gas in the absorption tower, the mercury removing ratio is improved by promoting oxidization of mercury.

In the mercury removing method of the present invention, it is preferable that the acidic solution be generated by bringing the exhaust gas into contact with water on the upstream side of the absorption tower, and the exhaust gas discharged from the absorption tower be brought into contact with the generated acidic solution.

With such a method, since it is possible to easily generate acidic solution from exhaust gas, it is not necessary to separately prepare acidic solution. Accordingly, costs relating to acidic solution are reduced.

In the mercury removing method of the present invention, it is preferable that the acidic solution be generated by repeatedly making contact with the water and the exhaust gas on the upstream side of the absorption tower.

With such a method, since it is possible to repeatedly spray low-concentration acidic solution onto exhaust gas, a high-concentration acidic solution can be generated. Accordingly, the mercury removing method of the present invention improves the mercury removing ratio by promoting the oxidization of mercury.

In the mercury removing method, a catalyst may be added to the acidic solution.

Since the exhaust gas includes a trace amount of metal, this metal serves as a catalyst, thereby promoting the oxidization of mercury.

The amount of metal included in the exhaust gas varies depending on burned coal. When the amount of metal included in the exhaust gas decreases, the concentration of a catalyst included in acidic solution decreases. Accordingly, the mercury oxidizing capability decreases. In this case, it is possible to remove mercury without decreasing the mercury oxidizing capability by adding a catalyst to the acidic solution.

In the mercury removing method of the present invention, it is preferable that at least any one of an iron ion and a manganese ion be added as the catalyst.

An iron ion and a manganese ion serve as an effective catalyst when mercury is oxidized. Accordingly, when such a metal ion is added as a catalyst, it is possible to remove mercury without decreasing mercury oxidizing capability.

DETAILED DESCRIPTION OF THE INVENTION

Figure 1:
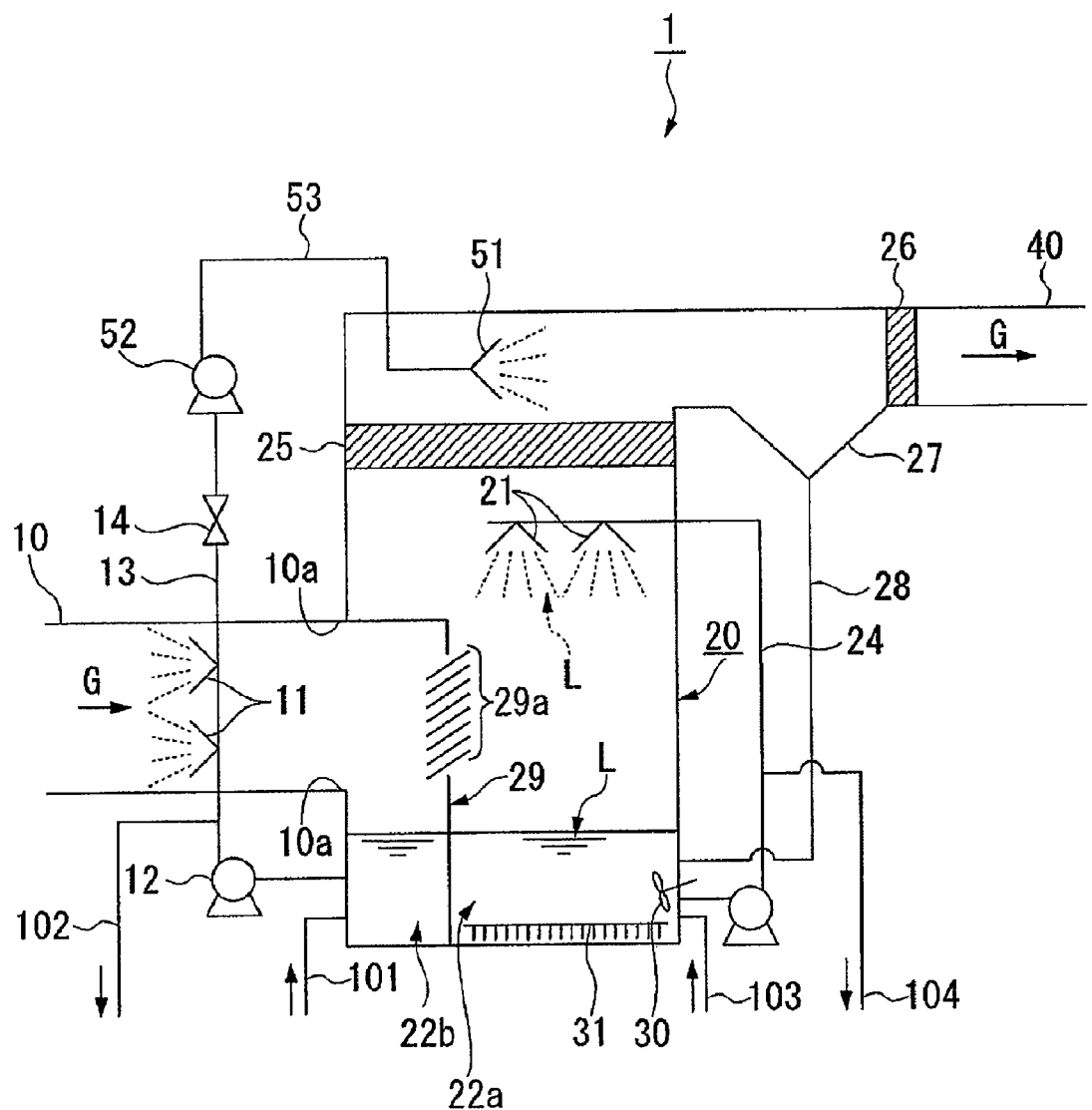
FIG. 1 is a schematic diagram illustrating a configuration of a mercury removing apparatus 1 according to a first embodiment of the present invention.

Hereinafter, a mercury removing apparatus of the present invention will be described with reference to the drawings. The following embodiments represent an aspect of the invention, do not limit the invention, and may be optionally modified within the scope of the technical concept of the invention. In the drawings, the scale of each of the members is appropriately modified for ease of viewing.

First Embodiment

Configuration of Mercury Removing Apparatus

FIG. 1 is a schematic diagram illustrating a configuration of a mercury removing apparatus 1 according to a first embodiment. As shown in FIG. 1, the mercury removing apparatus 1 includes a gas introducing passage 10, an absorption tower 20, and a gas discharging passage 40.

The gas introducing passage 10 connected to a boiler or the like of a thermal power station is connected to a substantially middle part of the absorption tower 20 in a vertical direction. The gas discharging passage 40 is connected to an upper part of the absorption tower 20. Exhaust gas G is introduced from the gas introducing passage 10 to the absorption tower 20, and is discharged from the absorption tower 20 through the gas discharging passage 40.

The exhaust gas G includes sulfur oxides such as sulfur dioxide or dusts such as combustion ashes including a trace amount of metal.

The absorption tower 20 is installed, for example, on the downstream side of a coal boiler (not shown) of a thermal power station, and removes sulfur oxide included in the exhaust gas G.

A lower portion of the absorption tower 20 serves as a storage tank for storing solution. The storage tank is divided into a sulfur removing solution storing tank 22a shown on the right side and an acidic solution storing tank 22a shown on the left side by a partition member 29. Sulfur removing solution L is stored in the sulfur removing solution storing tank 22a, acidic solution is stored in the acidic solution storing tank 22b.

The partition member 29 is disposed to block a gas introducing port 10a as viewed from the inside of the absorption tower 20. The partition member 29 is provided with a slit 29a. Accordingly, the partition member 29 allows the exhaust gas G to flow through the slit 29a, and prevents the sulfur removing solution L from entering the acidic solution storing tank (acidic solution storing portion) 22b.

The sulfur removing solution L stored in the sulfur removing solution storing tank 22a is supplied to a sulfur removing solution spraying nozzle 21 provided on the upper part of the connection portion 10a, through a sulfur removing solution circulating pump 23 and a sulfur removing solution supplying pipe 24. The sulfur removing solution spraying nozzle 21 sprays the sulfur removing solution L into the exhaust gas G, so as to remove sulfur oxide from the exhaust gas G.

The sulfur removing solution spraying nozzle 21 shown in FIG. 1 is arranged with only one row in a vertical direction of the absorption tower 20, but plural rows may be arranged.

The sulfur removing solution storing tank 22a is connected to a stirring device 30 for stirring the sulfur removing solution L, an air supplying pipe 31 for supplying air into the sulfur removing solution storing tank 22a, and a solution supplying pipe 103. The sulfur removing solution supplying pipe 24 is connected to a solution discharging pipe 104.

The sulfur removing solution L contains calcium carbonate. In addition, the sulfur removing solution L includes dusts and sulfur oxides removed from the exhaust gas G.

When the sulfur removing solution L is stirred while supplying air from the air supplying pipe 31, calcium carbonate and sulfur oxide react with each other, thereby precipitating calcium sulfate (gypsum). The precipitated calcium sulfate and dusts are discharged from the solution discharging pipe 104 to the outside together with part of the sulfur removing solution L by water pressure of the sulfur removing solution circulating pump 23.

As described above, the sulfur oxide and dusts are removed from the sulfur removing solution L, thereby preventing the sulfur removing solution spraying nozzle 21 and the sulfur removing solution supplying pipe 24 from clogging.

The sulfur removing solution L in the sulfur removing solution storing tank 22a is discharged from the solution discharge pipe 104 or is vaporized in the absorption tower 20, thereby reducing the sulfur removing solution L. In addition, the sulfur removing solution L reacts to the sulfur oxide removed from the exhaust gas G, thereby reducing calcium carbonate in the sulfur removing solution L. In this case, to supplement the reduced sulfur removing solution and calcium carbonate, sulfur removing solution is supplied from the solution supplying pipe 103 to the sulfur removing solution storing tank 22a.

The acidic solution storing tank 22b is connected to a water spraying nozzle 11 disposed in the gas introducing passage 10 through the acidic solution circulating pump 12 and the acidic solution supplying pipe 13. The acidic solution supplying pipe 13 extends to a control valve 14, and is connected from the control valve 14 through an acidic solution spraying pump 52 and an acidic solution supplying pipe 53 to an acidic solution spraying nozzle (acidic solution spraying portion) 51 provided at the upper part of the absorption tower 20.

The acidic solution storing tank 22b is connected to a solution supplying pipe (solution supplying portion) 101, and the acidic solution supplying pipe 13 is connected to a solution discharging pipe (solution discharging portion) 102.

The water spraying nozzle 11 is provided to spray acidic solution or water supplied from the acidic solution storing tank 22b. Water sprayed from the water spraying nozzle (acidic solution generating portion) 11 reacts to sulfur oxide included in the exhaust gas G to generate sulfuric acid (acidic solution). The acidic solution circulating pump 12 is operated with the control valve 14 closed, thereby repeatedly bringing exhaust gas into contact with the acidic solution. Accordingly, it is possible to raise the concentration of sulfuric acid.

When water or sulfuric acid is sprayed from the water spraying nozzle 11 into the exhaust gas G, dusts are introduced into the acidic solution. The dusts introduced to the acidic solution is discharged to the outside through the solution discharging pipe 102 together with part of the sulfuric acid. To discharge the dusts to the outside, the pressure of the acidic solution circulating pump 12 is used.

The sulfuric acid in the acidic solution storing tank 22b decreases due to being discharged from the solution discharging pipe 102 and being sprayed from an acidic solution spraying nozzle 51. Also, sulfuric acid decreases by vaporization in the acidic solution storing tank 22b. To supplement the sulfuric acid decrease as described above, water or sulfuric acid is supplied from the solution supplying pipe 101 to the acidic solution storing tank 22b.

The acidic solution spraying nozzle 51 is provided on the downstream side of the absorption tower 20 in the flow passage of the exhaust gas G, and sprays sulfuric acid into the exhaust gas G where the concentration of sulfur oxide decreases. The sulfuric acid sprayed from the acidic solution spraying nozzle 51 is supplied from the acidic solution storing tank 22b by operating the acidic solution spraying pump 52 with the control valve 14 opened.

In this case, since the exhaust gas G goes through the absorption tower 20 and thus the concentration of sulfur oxide is decreasing, metal mercury ($Hg^0$) and sulfuric acid are in a reactive state. Accordingly, it is possible to increase metal mercury ($Hg^0$) changed to dyadic mercury ($Hg^{2+}$), and the mercury removing ratio from the exhaust gas G is improved.

A mist eliminator 25 is horizontally disposed at the discharge port of the absorption tower 20 between the sulfur removing solution spraying nozzle 21 and the acidic solution spraying nozzle 51.

The mist eliminator 25 is provided to remove and trap the sulfur removing solution L remaining in the exhaust gas G. The concentration of the sulfur removing solution L in the exhaust gas G is decreased by the mist eliminator 25, thereby improving the mercury removing ratio.

A mist eliminator 26 is disposed between the acidic solution spraying nozzle 51 and the gas discharging passage 40.

The mist eliminator 26 is provided to remove and trap sulfuric acid remaining in the exhaust gas G. The sulfuric acid remaining in the exhaust gas G is removed by the mist eliminator 26, thereby suppressing the amount of sulfuric acid discharged to the air.

A sulfuric acid collecting portion 27 is disposed in the vicinity of the mist eliminator 26 close to the acidic solution spraying nozzle 51. The sulfuric acid collecting portion 27 is provided to collect the sulfuric acid trapped by the mist eliminator 26, and has a funnel shape for easily flowing sulfuric acid.

The sulfuric acid collecting portion 27 is connected to the sulfur removing solution storing tank 22a through a sulfuric acid collecting pipe 28, and the sulfuric acid trapped by the mist eliminator 26 is collected in the sulfur removing solution storing tank 22a.

[Mercury Removing Method]

Next, a mercury removing method using the mercury removing apparatus 1 having such a configuration will be described. A state where sulfur removing solution L is stored in the sulfur removing solution storing tank 22a and water is stored in the acidic solution storing tank 22b will be described first.

First, in the gas introducing passage 10, sulfuric acid is generated by spraying water from the water spraying nozzle 11 into the exhaust gas G.

The water sprayed from the water spraying nozzle 11 absorbs sulfur dioxide included in the exhaust gas G to generate sulfuric acid. The generated sulfuric acid is collected in the acidic solution storing tank 22b, and becomes concentrated sulfuric acid by repeatedly being sprayed from the water spraying nozzle 11.

In this case, since the concentration of sulfur oxide included in the exhaust gas G is high, the effect is insufficient. However, a part of metal mercury ($Hg^0$) is changed to dyadic mercury ($Hg^{2+}$) by the sulfuric acid sprayed to the exhaust gas G, and thus it is possible to remove it from the exhaust gas G.

The dyadic mercury and dusts removed from the exhaust gas G in the gas introducing passage 10 are discharged to the outside through the solution discharging pipe 102.

Then, sulfur oxide is removed from the exhaust gas G moved from the gas introducing passage 10 to the absorption tower 20.

In the absorption tower 20, the sulfur removing solution L is sprayed downward from the sulfur removing solution spraying nozzle 21 to remove sulfur oxide included in the exhaust gas G. The sulfur removing solution L sprayed from the sulfur removing solution spraying nozzle 21 is supplied from the sulfur removing solution storing tank 22a through the sulfur removing solution circulating pump 23 and the sulfur removing solution supplying pipe 24.

The sulfur oxide collected from the exhaust gas G in the sulfur removing solution storing tank 22a reacts to calcium carbonate in the sulfur removing solution storing tank 22a to generate calcium sulfate (gypsum). The generated calcium sulfate is discharged to the outside through the solution discharging pipe 104.

The dusts collected together with the sulfur oxide are also discharged to the outside through the solution discharging pipe 104.

The exhaust gas G, from which the sulfur oxide is removed, is moved to the upper part of the absorption tower 20 through the mist eliminator 25.

At this time, the sulfur removing solution L is removed from the exhaust gas G passing through the mist eliminator 25.

Then, sulfuric acid is sprayed into the exhaust gas G passing through the mist eliminator 25, thereby removing mercury from the exhaust gas G.

Sulfuric acid is supplied from the acidic solution storing tank 22b to the acidic solution spraying nozzle 51, and the sulfuric acid is sprayed from the acidic solution spraying nozzle 51. In the exhaust gas G at this time, little sulfur oxide and sulfur removing solution L remain, and mercury and sulfuric acid are in a reactive state.

The gas temperature decreases by spraying the sulfur removing solution, and thus the exhaust gas G is in a moisture-saturation state. Accordingly, the temperature of the exhaust gas G further decreases by spraying sulfuric acid, and a large amount of moisture is precipitated in the exhaust gas G. Accordingly, dyadic mercury ($Hg^{2+}$) generated by contact with sulfuric acid is absorbed by the precipitated moisture.

Therefore, it is possible to carry out both absorption and oxidization of mercury, and it is easy to remove mercury from the exhaust gas G.

To oxidize mercury, a catalyst is necessary in addition to acidic solution such as sulfuric acid. As a catalyst, for example, an iron ion ($Fe^{3+}$) and a manganese ion ($Mn^{2+}$) may be used. These metal ions are included in the dusts of the exhaust gas G, and are absorbed from the exhaust gas G into sulfuric acid in the course of generating sulfuric acid. Accordingly, the sulfuric acid sprayed from the acidic solution spraying nozzle 51 includes a catalyst, and it is possible to efficiently oxidize mercury.

However, since the concentration of metal ions included in the exhaust gas G is different according to the types of burned coal, the concentration of metal ions included in the sulfuric acid may decrease. In such a case, mercury and sulfuric acid hardly react to each other, and the mercury removing ratio from the exhaust gas G decreases.

To improve the mercury removing ratio, a catalyst may be added to the sulfuric acid. For example, it is possible to increases the concentration of a catalyst by supplying sulfuric acid or water, to which the catalyst is added, to the acidic solution storing tank 22b through the solution supplying pipe 101.

A particularly effective catalyst is an iron ion ($Fe^{3+}$) and a manganese ion ($Mn^{2+}$). The results of measuring the mercury removing ratio in the case of using an iron ion and a manganese ion as a catalyst will be described below.

Figure 2:
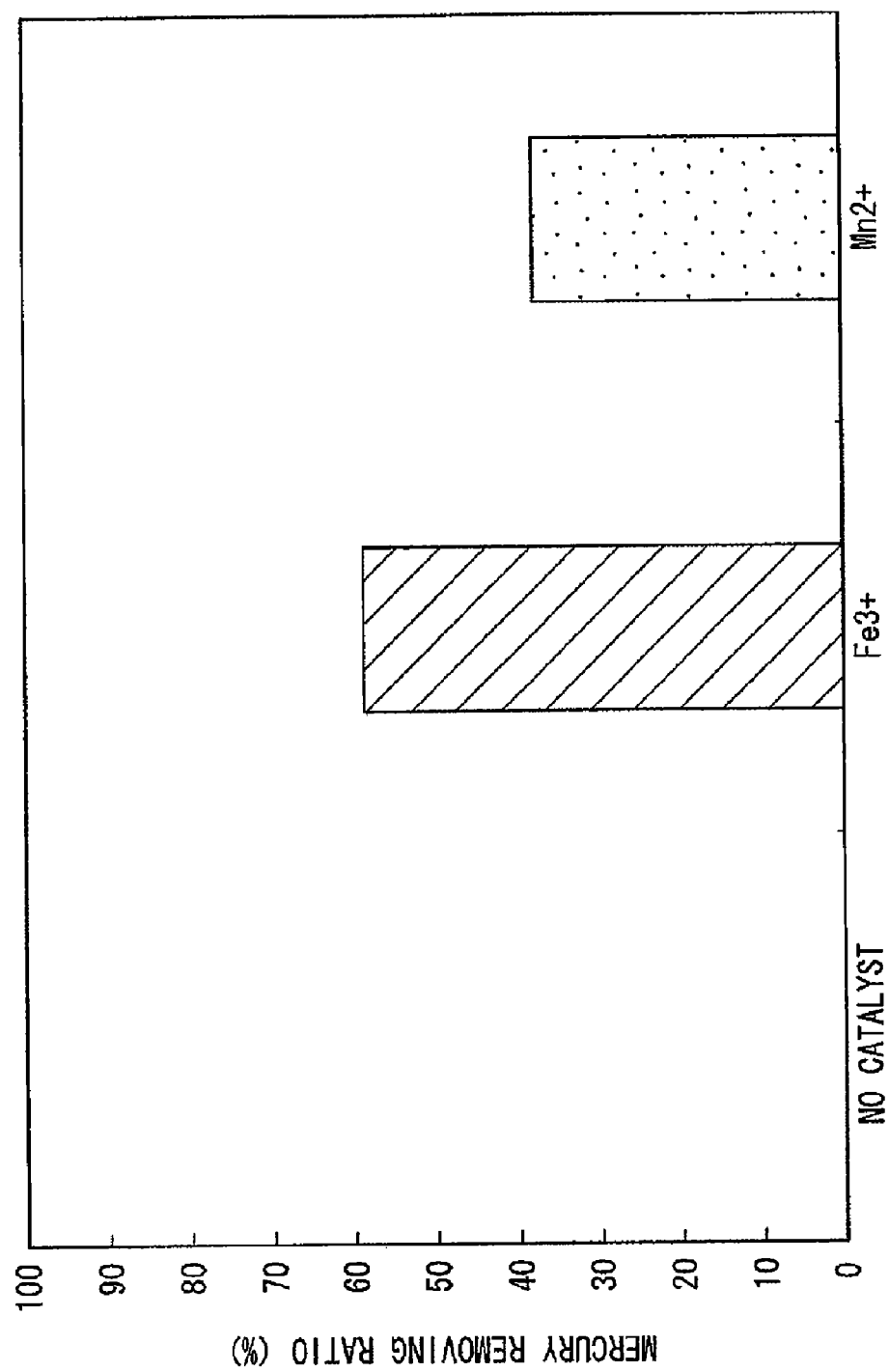
FIG. 2 is a diagram illustrating a relationship between a catalyst and a mercury removing ratio.

FIG. 2 is a diagram illustrating a relationship between a catalyst and a mercury removing ratio. FIG. 2 shows mercury removing ratios in sulfuric acid including no catalyst, sulfuric acid including an iron ion ($Fe^{3+}$), and sulfuric acid including a manganese ion ($Mn^{2+}$).

A potential of hydrogen (pH) of sulfuric acid in the experiment of FIG. 2 was 1.3, and an iron ion concentration and a manganese ion concentration were 0.2 (mol/l).

As shown in FIG. 2, when the sulfuric acid including no catalyst was used as acidic solution, mercury was not substantially removed. On the contrary, when the sulfuric acid including an iron ion as a catalyst was used as acidic solution, a mercury removing ratio was about 60%. When manganese ions were used as a catalyst, the mercury removing ratio was about 40%.

From the measuring result of FIG. 2, it was known that an iron ion and a manganese ion are effective in removing mercury. Accordingly, when the concentration of a catalyst in sulfuric acid decreased, at least one of iron ions and manganese ions are added, thereby improving the mercury removing ratio.

Metal ions, a metal ion group, or the like in addition to iron ions or manganese ions included in dusts may serve as a catalyst although the effect thereof is small as compared with iron ions and manganese ions. Accordingly, a metal ion or a metal ion group in addition to iron ions or manganese ions may be added to sulfuric acid as a catalyst.

The exhaust gas G, from which mercury is removed, passes through the mist eliminator 26. In the mist eliminator 26, sulfuric acid remaining in the exhaust gas G is removed.

The sulfuric acid removed in the mist eliminator 26 is collected in the sulfur removing solution storing tank 22a through the sulfuric acid collecting portion 27 and the sulfuric acid collecting pipe 28, and is discharged from the solution discharging pipe 104 to the outside.

The exhaust gas G passing through the mist eliminator 26 is discharged from the gas discharging passage 40 to the outside.

According to such a mercury removing apparatus 1, it is possible to obtain the following advantages.

First, since it is possible to spray sulfuric acid into the exhaust gas G, from which sulfur oxide is removed, by providing the acidic solution spraying nozzle on the downstream side of the sulfur removing solution spraying nozzle 21, it is possible to increase sulfuric acid reacting to mercury. Accordingly, oxidization of mercury is promoted, and thus it is possible to improve the mercury removing ratio from the exhaust gas G.

Since it is possible to easily generate sulfuric acid by spraying water from the water spraying nozzle 11 by providing the water spraying nozzle 11 in the exhaust gas introducing passage 10, it is possible to reduce the costs of sulfuric acid necessary for removing mercury.

Since the oxide storing tank 22b and the acidic solution spraying nozzle 51 are connected to each other through the acidic solution supplying pipe 13 and the acidic solution supplying pipe 53, it is possible to supply the sulfuric acid generated by the gas introducing passage 10 to the acidic solution spraying nozzle 51.

It is possible to decrease the temperature of the exhaust gas G by spraying water and sulfuric acid in the gas introducing passage 10. Accordingly, the volume of the exhaust gas G decreases, and thus it is possible to reduce the size of the absorption tower 20. Therefore, it is possible to reduce production costs and the installation area of the absorption tower 20.

Since it is possible to discharge the dusts included in the exhaust gas G introduced at the time of generating sulfuric acid by providing the acidic solution supplying pipe 13 with the solution discharging pipe 102, it is possible to prevent the acidic solution supplying pipe 13 and the water spraying nozzle 11 from clogging.

Since it is possible to supplement sulfuric acid although the water volume of the acidic solution storing tank 22b by providing the acidic solution storing tank 22b with the solution supplying pipe 101, it is possible to continuously operate the mercury removing apparatus.

Since it is possible to reduce the installation area relating to the acidic solution storing tank 22b by providing the acidic solution storing tank 22b in the absorption tower 20, it is possible to reduce production cost by reducing the size of the apparatus.

Since it is possible to repeatedly spray the sulfuric acid stored in the acidic solution storing tank 22b from the water spraying nozzle 11, it is possible to easily generate concentrated sulfuric acid having a potential of hydrogen (pH) of 1.0 or less.

Accordingly, it is possible to improve the mercury removing ratio by promoting the oxidization of mercury.

Even when the amount of the catalyst included in the exhaust gas G is small, it is possible to increase the concentration of the catalyst included in sulfuric acid by adding the catalyst to sulfuric acid. Accordingly, the reaction between mercury and sulfuric acid is promoted, and thus it is possible to improve the mercury removing ratio.

In addition, since it is possible to increase the concentration of a catalyst included in sulfuric acid by adding at least one of iron ions and manganese ions to sulfuric acid as a catalyst, reaction between mercury and sulfuric acid is promoted and thus it is possible to improve a mercury removing ratio.

Second Embodiment

Next, a second embodiment of the invention will be described.

A mercury removing apparatus according to the present embodiment is different from the mercury removing apparatus 1 according to the first embodiment in that an oxidization tower (acidic solution generating portion) for generating sulfuric acid and an absorption tower are provided separately.

In the present embodiment, the same reference numerals and symbols are given to constituent elements overlapping with those of the first embodiment, and the description thereof is omitted.

Figure 3:
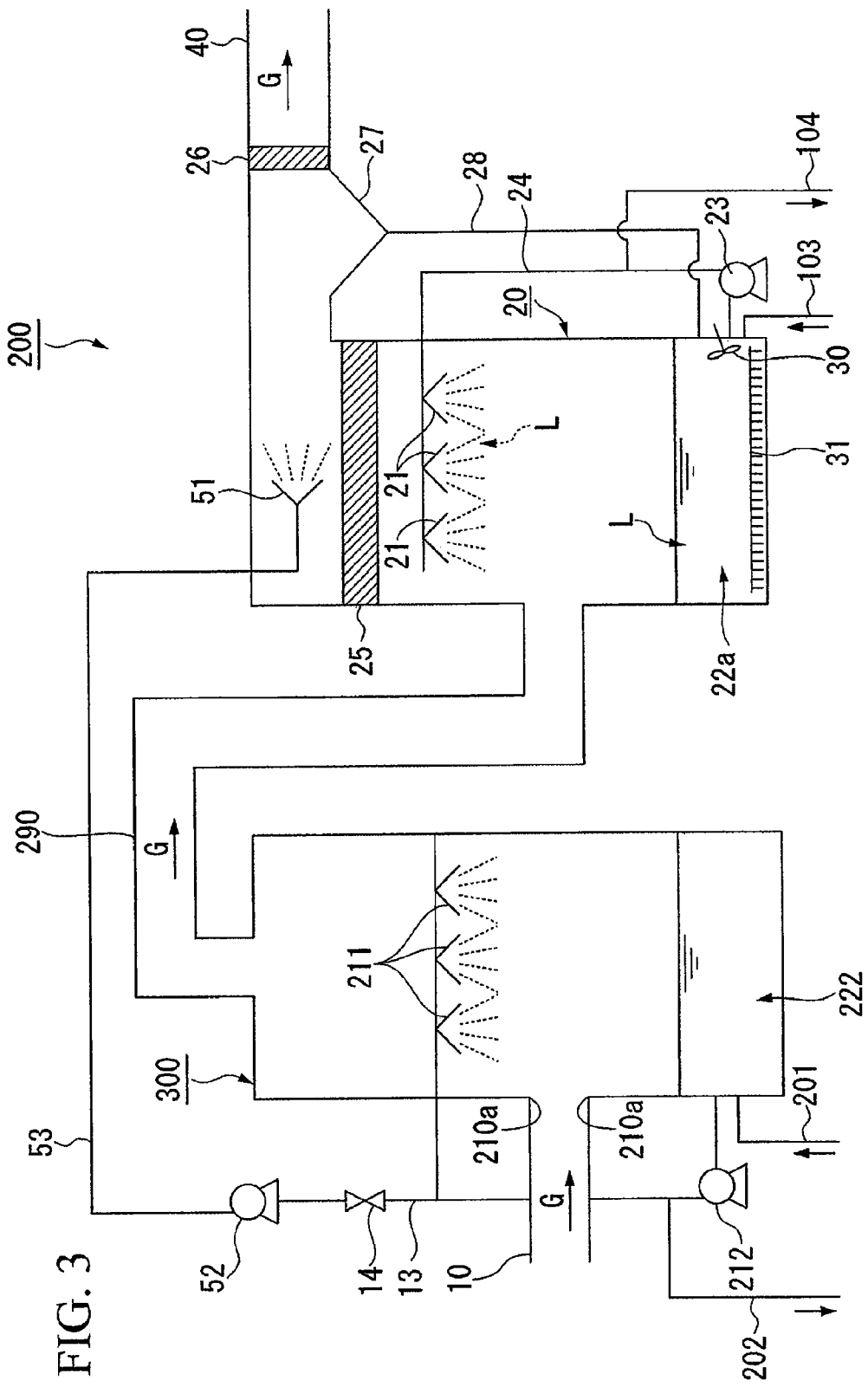
FIG. 3 is a schematic diagram illustrating a configuration of a mercury removing apparatus 200 according to a second embodiment.
Figure 4:
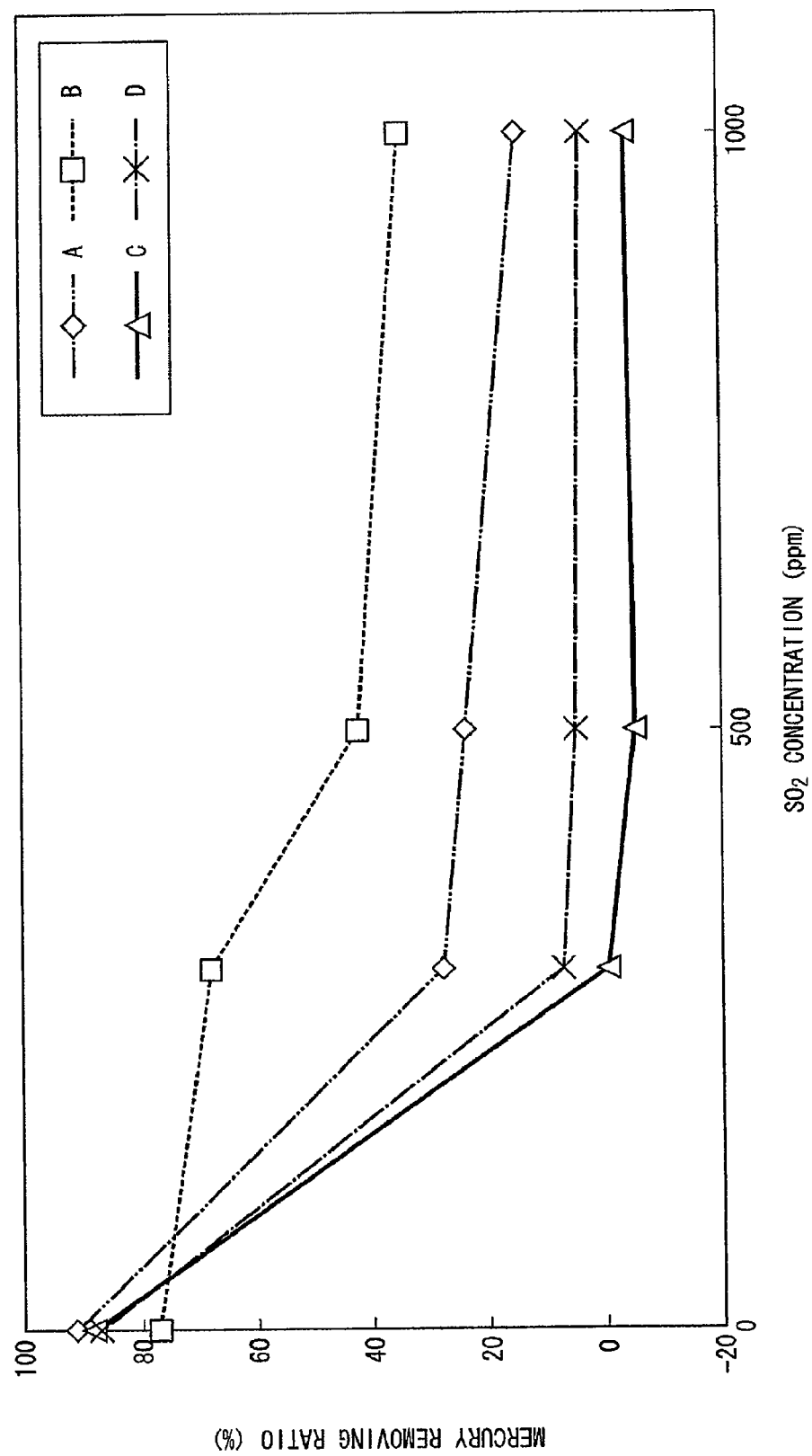
FIG. 4 is a diagram illustrating a relationship between a sulfur dioxide concentration of exhaust gas and a mercury removing ratio.
Figure 5:
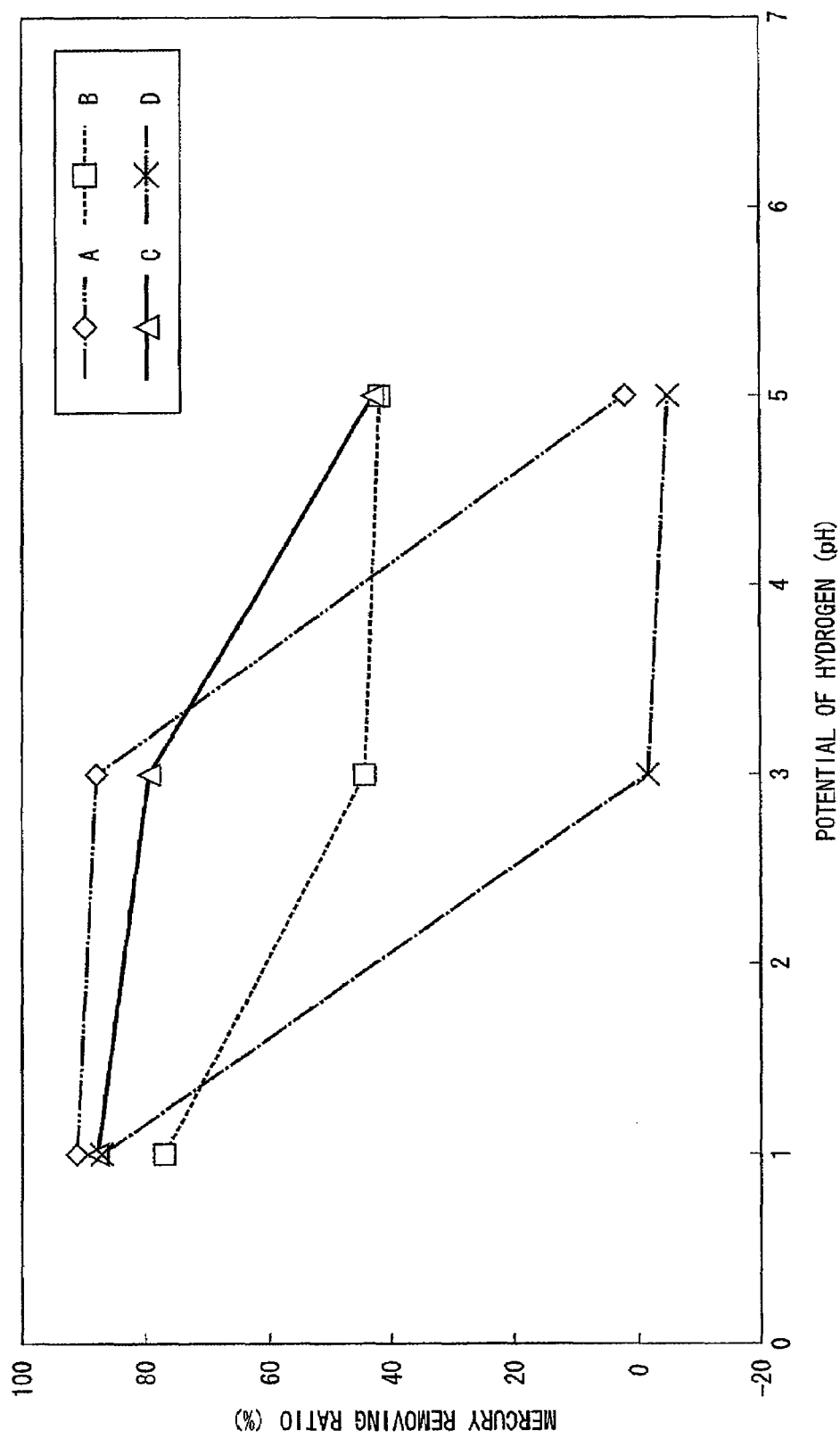
FIG. 5 is a diagram illustrating a relationship between a hydrogen ion concentration of absorption solution and a mercury removing ratio.

FIG. 3 is a schematic diagram illustrating a configuration of a mercury removing apparatus 200 according to the second embodiment. The mercury removing apparatus 200 is provided with a gas introducing passage 10, an oxidization tower 300, a gas moving passage 290, an absorption tower 20, and a gas discharging passage 40.

The oxidization tower 300 is provided on the upstream side of the absorption tower 20, and generates sulfuric acid by spraying water into exhaust gas G. The oxidization tower 300 is disposed separately from the absorption tower 20.

The gas introducing tower 10 is connected to a substantially middle part of the oxidization tower 300 in a vertical direction. The gas moving passage 290 connecting the upper end of the oxidization tower 300 and a substantially middle part of the absorption tower 20 in a vertical direction is provided.

In the oxidization tower 300, a water spraying nozzle 211 is provided above a connection portion 210a of the gas introducing passage 10. The water spraying nozzle 211 is arranged with only one row in a vertical direction of the oxidization tower 300, but plural rows may be arranged.

The lower part of the oxidization tower 300 is an acidic solution storing tank (acidic solution storing portion) 222 for storing water or sulfuric acid. The acidic solution storing tank 222 is connected to the water spraying nozzle 211 through an acidic solution circulating pump 212 and an acidic solution supplying pipe 13. The acidic solution supplying pipe 13 extends to the control valve 14. The acidic solution supplying pipe 13 is connected from the control valve 14 through the acidic solution spraying pump 52 and the acidic solution supplying pipe 53 to the acidic solution spraying nozzle 51 provided at the upper part of the absorption tower 20.

The acidic solution storing tank 222 is connected to a solution supplying pipe (solution supplying portion) 201, and the acidic solution supplying pipe 13 is connected to a solution discharging pipe (solution discharging portion) 202.

In the oxidization tower 300, sulfuric acid is generated by spraying water from the water spraying nozzle 211 into exhaust gas G. The sulfuric acid becomes concentrated sulfuric acid by repeatedly supplying sulfuric acid stored in the acidic solution storing tank 22 to the water spraying nozzle 211.

The generated sulfuric acid is supplied to the acidic solution spraying nozzle 51 in the absorption tower 20, and is sprayed into the exhaust gas G from which sulfur oxide is removed.

In the present embodiment, the lower part in the absorption tower 20 serves as the sulfur removing solution storing tank 22a throughout the whole face. Accordingly, a partition member for dividing the sulfur removing solution storing tank and the acidic solution storing tank is not provided in the absorption tower 20.

Since the oxidization tower 300 and the absorption tower 20 are separately provided and thus the sulfur removing solution L is not mixed with the sulfuric acid stored in the acidic solution storing tank 222, it is possible to prevent reaction between the sulfuric acid and the sulfur removing solution in the acidic solution storing tank 222.

Moreover, in the first and second embodiment described above, the method for oxidizing mercury by spraying sulfuric acid from the acidic solution spraying nozzle 51 has been described, but mercury may be oxidized by adding a chlorine compound into exhaust gas and spraying sulfuric acid in which concentration of the chlorine compound increases.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A mercury removing apparatus for removing mercury from exhaust gas generated by coal combustion, wherein an acidic solution generating portion for generating an acidic solution is provided on an upstream side of an absorption tower by spraying water into the exhaust gas, and
   wherein an acidic solution spraying portion for spraying acidic solution into the exhaust gas is provided on a downstream side of the absorption tower,
   further wherein the acidic solution generating portion and the acidic solution spraying portion are connected to each other.

2. The mercury removing apparatus according to claim 1, wherein the acidic solution generating portion is provided with a solution discharging portion and a solution supplying portion.

3. The mercury removing apparatus according to claim 2, wherein the acidic solution generating portion has an acidic solution storing portion for storing the acidic solution, and the acidic solution storing portion is provided in the absorption tower.

4. The mercury removing apparatus according to claim 1, wherein the acidic solution generating portion has an acidic solution storing portion for storing the acidic solution, and the acidic solution storing portion is provided in the absorption tower.

5. A mercury removing method for removing mercury from exhaust gas generated by coal combustion, wherein an acidic solution is generated by bringing exhaust gas into contact with water on an upstream side of an absorption tower, wherein concentration of sulfur oxide of the exhaust gas is lowered in an absorption tower, and then the exhaust gas discharged from the absorption tower is brought into contact with the generated acidic solution to remove mercury.

6. The mercury removing method according to claim 5, wherein the acidic solution is generated by repeatedly making contact with the water and the exhaust gas on the upstream side of the absorption tower.

7. The mercury removing method according to claim 5, wherein a catalyst is added to the acidic solution.

8. The mercury removing method according to claim 7, wherein at least one of iron ions and manganese ions are added as the catalyst.

* * * * *